United States Patent
Gonzalez et al.

(10) Patent No.: US 9,969,645 B2
(45) Date of Patent: May 15, 2018

(54) METHOD FOR SEALING AN OXYGEN TRANSPORT MEMBRANE ASSEMBLY

(71) Applicants: Javier E. Gonzalez, East Amherst, NY (US); Arthur F. Grant, Amherst, NY (US)

(72) Inventors: Javier E. Gonzalez, East Amherst, NY (US); Arthur F. Grant, Amherst, NY (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 658 days.

(21) Appl. No.: 14/134,276

(22) Filed: Dec. 19, 2013

(65) Prior Publication Data

US 2014/0169862 A1   Jun. 19, 2014

Related U.S. Application Data

(60) Provisional application No. 61/739,403, filed on Dec. 19, 2012.

(51) Int. Cl.
   *C03C 8/24* (2006.01)
   *C03C 10/00* (2006.01)
   (Continued)

(52) U.S. Cl.
   CPC .............. *C03C 8/24* (2013.01); *B01D 65/003* (2013.01); *B01D 71/024* (2013.01);
   (Continued)

(58) Field of Classification Search
   CPC ..... C03C 8/24; C03C 10/0018; B01D 65/003; B01D 71/024
   See application file for complete search history.

(56) References Cited

U.S. PATENT DOCUMENTS

| 2,593,507 A | 4/1952 | Wainer |
| 2,692,760 A | 10/1954 | Flurschutz |

(Continued)

FOREIGN PATENT DOCUMENTS

| DE | 10330859 A1 | 2/2004 |
| DE | 102004038435 A1 | 2/2006 |

(Continued)

OTHER PUBLICATIONS

Switzer et al., "Cost and Feasibility Study on the Praxair Advanced Boiler for the C02 Capture Project's Refinery Scenario", Carbon Dioxide Capture for Deep Geologic Formations, vol. 1, D.C. Thomas and S.M. Benson (Eds.), Copyright 2005 Published by Elsevier Ltd., Chapter 32, pp. 561-579.

(Continued)

*Primary Examiner* — Jeffry H Aftergut
*Assistant Examiner* — Jaeyun Lee
(74) *Attorney, Agent, or Firm* — Ralph J. Mancini (57) ABSTRACT

An improved method of sealing a ceramic part to a solid part made of ceramic, metal, cermet or a ceramic coated metal is provided. The improved method includes placing a bond agent comprising an $Al_2O_3$ and $SiO_2$ based glass-ceramic material and organic binder material on adjoining surfaces of the ceramic part and the solid part. The assembly is heated to a first target temperature that removes or dissolves the organic binder material from the bond agent and the assembly is subjected to a second induction heating step at a temperature ramp rate of between about 100° C. and 200° C. per minute to temperatures where the glass-ceramic material flows and wets the interface between adjoining surfaces. The assembly is rapidly cooled at a cooling rate of about 140° C. per minute or more to induce nucleation and re-crystallization of the glass-ceramic material to form a dense, durable and gas-tight seal.

6 Claims, 6 Drawing Sheets

(51) Int. Cl.
*C04B 37/00* (2006.01)
*B01D 65/00* (2006.01)
*B01D 71/02* (2006.01)
*C04B 35/626* (2006.01)
*C04B 35/632* (2006.01)
*C04B 35/634* (2006.01)
*C04B 35/638* (2006.01)
*C04B 37/02* (2006.01)
*H01M 8/0282* (2016.01)
*H01M 8/0286* (2016.01)

(52) U.S. Cl.
CPC ...... *C03C 10/0018* (2013.01); *C04B 35/6264* (2013.01); *C04B 35/632* (2013.01); *C04B 35/638* (2013.01); *C04B 35/6342* (2013.01); *C04B 37/005* (2013.01); *C04B 37/025* (2013.01); *C04B 2235/6562* (2013.01); *C04B 2235/6565* (2013.01); *C04B 2237/10* (2013.01); *C04B 2237/348* (2013.01); *C04B 2237/40* (2013.01); *C04B 2237/401* (2013.01); *C04B 2237/60* (2013.01); *C04B 2237/708* (2013.01); *C04B 2237/765* (2013.01); *H01M 8/0282* (2013.01); *H01M 8/0286* (2013.01); *Y10T 403/477* (2015.01)

(56) References Cited

U.S. PATENT DOCUMENTS

| | | | |
|---|---|---|---|
| 3,282,803 A | 11/1966 | Poepel et al. | |
| 3,317,298 A | 5/1967 | Klomp et al. | |
| 3,468,647 A * | 9/1969 | Buyers ............... | C04B 37/021 228/124.6 |
| 3,770,621 A | 11/1973 | Collins et al. | |
| 3,861,723 A | 1/1975 | Kunz et al. | |
| 3,868,817 A | 3/1975 | Marion et al. | |
| 3,930,814 A | 1/1976 | Gessner | |
| 3,976,451 A | 8/1976 | Blackmer et al. | |
| 4,013,592 A | 3/1977 | Matsuoka et al. | |
| 4,128,776 A | 12/1978 | Bonaquist et al. | |
| 4,153,426 A | 5/1979 | Wintrell | |
| 4,162,993 A | 7/1979 | Retalick | |
| 4,175,153 A | 11/1979 | Dobo et al. | |
| 4,183,539 A | 1/1980 | French et al. | |
| 4,206,803 A | 6/1980 | Finnemore et al. | |
| 4,261,167 A | 4/1981 | Paull et al. | |
| 4,292,209 A | 9/1981 | Marchant et al. | |
| 4,350,617 A | 9/1982 | Retalick et al. | |
| 4,357,025 A | 11/1982 | Eckart | |
| 4,365,021 A | 12/1982 | Pirooz | |
| 4,373,575 A | 2/1983 | Hayes | |
| 4,402,871 A | 9/1983 | Retalick | |
| 4,609,383 A | 9/1986 | Bonaventura et al. | |
| 4,631,238 A | 12/1986 | Ruka | |
| 4,650,814 A | 3/1987 | Keller | |
| 4,651,809 A | 3/1987 | Gollnick et al. | |
| 4,720,969 A | 1/1988 | Jackman | |
| 4,734,273 A | 3/1988 | Haskell | |
| 4,749,632 A | 6/1988 | Flandermeyer et al. | |
| 4,783,085 A | 11/1988 | Wicks et al. | |
| 4,791,079 A | 12/1988 | Hazbun | |
| 4,862,949 A | 9/1989 | Bell, III | |
| 4,866,013 A | 9/1989 | Anseau et al. | |
| 5,021,137 A | 6/1991 | Joshi et al. | |
| 5,035,726 A | 7/1991 | Chen et al. | |
| 5,061,297 A | 10/1991 | Krasberg | |
| 5,143,751 A | 9/1992 | Richard et al. | |
| 5,169,506 A | 12/1992 | Michaels | |
| 5,169,811 A | 12/1992 | Cipollini et al. | |
| 5,171,646 A | 12/1992 | Rohr | |
| 5,185,301 A | 2/1993 | Li et al. | |
| 5,205,990 A | 4/1993 | Lawless | |
| 5,240,480 A | 8/1993 | Thorogood et al. | |
| 5,259,444 A | 11/1993 | Wilson | |
| 5,286,686 A | 2/1994 | Haig et al. | |
| 5,298,469 A | 3/1994 | Haig et al. | |
| 5,302,258 A | 4/1994 | Renlund et al. | |
| 5,306,411 A | 4/1994 | Mazanec et al. | |
| 5,342,705 A | 8/1994 | Minh et al. | |
| 5,356,730 A | 10/1994 | Minh et al. | |
| 5,417,101 A | 5/1995 | Weich | |
| 5,432,705 A | 7/1995 | Severt et al. | |
| 5,454,923 A | 10/1995 | Nachlas et al. | |
| 5,478,444 A | 12/1995 | Liu et al. | |
| 5,534,471 A | 7/1996 | Carolan et al. | |
| 5,547,494 A | 8/1996 | Prasad et al. | |
| 5,569,633 A | 10/1996 | Carolan et al. | |
| 5,599,509 A | 2/1997 | Toyao et al. | |
| 5,643,355 A | 7/1997 | Phillips et al. | |
| 5,649,517 A | 7/1997 | Poola et al. | |
| 5,707,911 A | 1/1998 | Rakhimov et al. | |
| 5,750,279 A | 5/1998 | Carolan et al. | |
| 5,804,155 A | 9/1998 | Farrauto et al. | |
| 5,820,654 A | 10/1998 | Gottzman et al. | |
| 5,820,655 A | 10/1998 | Gottzmann et al. | |
| 5,837,125 A | 11/1998 | Prasad et al. | |
| 5,855,762 A | 1/1999 | Phillips et al. | |
| 5,864,576 A | 1/1999 | Nakatani et al. | |
| 5,902,379 A | 5/1999 | Phillips et al. | |
| 5,927,103 A | 7/1999 | Howard | |
| 5,932,141 A | 8/1999 | Rostrop-Nielsen et al. | |
| 5,944,874 A | 8/1999 | Prasad et al. | |
| 5,964,922 A | 10/1999 | Keskar et al. | |
| 5,975,130 A | 11/1999 | Ligh et al. | |
| 5,980,840 A | 11/1999 | Kleefisch et al. | |
| 6,010,614 A | 1/2000 | Keskar et al. | |
| 6,035,662 A | 3/2000 | Howard et al. | |
| 6,048,472 A | 4/2000 | Nataraj et al. | |
| 6,051,125 A | 4/2000 | Pham et al. | |
| 6,070,471 A | 6/2000 | Westphal et al. | |
| 6,077,323 A | 6/2000 | Nataraj et al. | |
| 6,110,979 A | 8/2000 | Nataraj et al. | |
| 6,113,673 A | 9/2000 | Loutfy et al. | |
| 6,114,400 A | 9/2000 | Nataraj et al. | |
| 6,139,810 A | 10/2000 | Gottzmann et al. | |
| 6,153,163 A | 11/2000 | Prasad et al. | |
| 6,191,573 B1 | 2/2001 | Noda | |
| RE37,134 E | 4/2001 | Wilson | |
| 6,214,066 B1 | 4/2001 | Nataraj et al. | |
| 6,214,314 B1 | 4/2001 | Nataraj et al. | |
| 6,268,075 B1 | 7/2001 | Autenrieth et al. | |
| 6,290,757 B1 | 9/2001 | Lawless | |
| 6,293,084 B1 | 9/2001 | Drnevich et al. | |
| 6,293,978 B2 | 9/2001 | Kleefisch et al. | |
| 6,296,686 B1 | 10/2001 | Prasad et al. | |
| 6,333,015 B1 | 12/2001 | Lewis | |
| 6,352,624 B1 | 3/2002 | Crome et al. | |
| 6,355,093 B1 | 3/2002 | Schwartz et al. | |
| 6,360,524 B1 | 3/2002 | Drnevich et al. | |
| 6,368,491 B1 | 4/2002 | Cao et al. | |
| 6,382,958 B1 | 5/2002 | Bool, III et al. | |
| 6,394,043 B1 | 5/2002 | Bool, III et al. | |
| 6,402,156 B1 * | 6/2002 | Schutz ............... | B01D 63/061 277/316 |
| 6,402,988 B1 | 6/2002 | Gottzmann et al. | |
| 6,430,966 B1 | 8/2002 | Meinhardt et al. | |
| 6,468,328 B2 | 10/2002 | Sircar et al. | |
| 6,475,657 B1 | 11/2002 | Del-Gallo et al. | |
| 6,492,290 B1 | 12/2002 | Dyer et al. | |
| 6,532,769 B1 | 3/2003 | Meinhardt et al. | |
| 6,537,514 B1 | 3/2003 | Prasad et al. | |
| 6,562,104 B2 | 5/2003 | Bool, III et al. | |
| 6,592,731 B1 | 7/2003 | Lawless | |
| 6,638,575 B1 | 10/2003 | Chen et al. | |
| 6,641,626 B2 | 11/2003 | Van Calcar et al. | |
| 6,652,626 B1 | 11/2003 | Plee | |
| 6,681,589 B2 | 1/2004 | Brudnicki | |
| 6,695,983 B2 | 2/2004 | Prasad et al. | |
| 6,783,750 B2 | 8/2004 | Shah et al. | |
| 6,786,952 B1 | 9/2004 | Risdal et al. | |
| 6,811,904 B2 | 11/2004 | Gorte et al. | |
| 6,846,511 B2 | 1/2005 | Visco et al. | |
| 6,916,570 B2 | 7/2005 | Vaughey et al. | |

(56) References Cited

U.S. PATENT DOCUMENTS

| | | |
|---|---|---|
| 7,077,133 B2 | 7/2006 | Yagi et al. |
| 7,125,528 B2 | 10/2006 | Besecker et al. |
| 7,153,559 B2 | 12/2006 | Ito et al. |
| 7,179,323 B2 | 2/2007 | Stein et al. |
| 7,229,537 B2 | 6/2007 | Chen et al. |
| 7,261,751 B2 | 8/2007 | Dutta et al. |
| 7,320,778 B2 | 1/2008 | Whittenberger |
| 7,351,488 B2 | 4/2008 | Visco et al. |
| 7,374,601 B2 | 5/2008 | Bonchonsky et al. |
| 7,396,442 B2 | 7/2008 | Bagby et al. |
| 7,427,368 B2 | 9/2008 | Drnevich |
| 7,470,811 B2 | 12/2008 | Thiebaut |
| 7,510,594 B2 | 3/2009 | Wynn et al. |
| 7,534,519 B2 | 5/2009 | Cable et al. |
| 7,556,676 B2 | 7/2009 | Nagabhushana et al. |
| 7,588,626 B2 | 9/2009 | Gopalan et al. |
| 7,658,788 B2 | 2/2010 | Holmes et al. |
| 7,786,180 B2 | 8/2010 | Fitzpatrick |
| 7,833,314 B2 | 11/2010 | Lane et al. |
| 7,846,236 B2 | 12/2010 | Del-Gallo et al. |
| 7,856,829 B2 | 12/2010 | Shah et al. |
| 7,871,579 B2 | 1/2011 | Tentarelli |
| 7,901,837 B2 | 3/2011 | Jacobson et al. |
| 7,906,079 B2 | 3/2011 | Whittenberger et al. |
| 7,968,208 B2 | 6/2011 | Hodgson |
| 8,070,922 B2 | 12/2011 | Nelson et al. |
| 8,128,988 B2 | 3/2012 | Yasumoto et al. |
| 8,196,387 B2 | 6/2012 | Shah et al. |
| 8,201,852 B2 | 6/2012 | Linhorst et al. |
| 8,262,755 B2 | 9/2012 | Repasky et al. |
| 8,323,378 B2 | 12/2012 | Swami et al. |
| 8,323,463 B2 | 12/2012 | Christie et al. |
| 8,349,214 B1 | 1/2013 | Kelly et al. |
| 8,419,827 B2 | 4/2013 | Kelly et al. |
| 8,435,332 B2 | 5/2013 | Christie et al. |
| 8,455,382 B2 | 6/2013 | Carolan et al. |
| 8,658,328 B2 | 2/2014 | Suda et al. |
| 8,795,417 B2 | 8/2014 | Christie et al. |
| 8,894,944 B2 | 11/2014 | Larsen et al. |
| 9,023,245 B2 | 5/2015 | Chakravarti et al. |
| 9,115,045 B2 | 8/2015 | Chakravarti et al. |
| 9,212,113 B2 | 12/2015 | Chakravarti et al. |
| 9,296,671 B2 | 3/2016 | Stuckert et al. |
| 9,365,466 B2 | 6/2016 | Chakravarti et al. |
| 9,452,401 B2 | 9/2016 | Kelly et al. |
| 9,453,644 B2 | 9/2016 | Kromer et al. |
| 2002/0073938 A1 | 6/2002 | Bool et al. |
| 2002/0078906 A1 | 6/2002 | Prasad et al. |
| 2002/0155061 A1 | 10/2002 | Prasad et al. |
| 2003/0039601 A1 | 2/2003 | Halvorson et al. |
| 2003/0039608 A1 | 2/2003 | Shah et al. |
| 2003/0054154 A1 | 3/2003 | Chen et al. |
| 2003/0068260 A1 | 4/2003 | Wellington |
| 2003/0230196 A1 | 12/2003 | Kim |
| 2004/0042944 A1 | 3/2004 | Sehlin et al. |
| 2004/0043272 A1 | 3/2004 | Gorte |
| 2004/0065541 A1 | 4/2004 | Sehlin |
| 2004/0089973 A1 | 5/2004 | Hoang |
| 2004/0135324 A1* | 7/2004 | Brule ............... C04B 35/117 277/628 |
| 2004/0221722 A1 | 11/2004 | Prasad et al. |
| 2005/0037299 A1 | 2/2005 | Gottzmann |
| 2005/0058871 A1 | 3/2005 | Li et al. |
| 2005/0061663 A1 | 3/2005 | Chen et al. |
| 2005/0137810 A1 | 6/2005 | Esposito, Jr. |
| 2005/0214612 A1 | 9/2005 | Visco et al. |
| 2005/0248098 A1 | 11/2005 | Sisk et al. |
| 2005/0263405 A1 | 12/2005 | Jacobson et al. |
| 2006/0019827 A1 | 1/2006 | Whittenberger |
| 2006/0029539 A1 | 2/2006 | Dutta et al. |
| 2006/0054301 A1 | 3/2006 | McRay et al. |
| 2006/0062707 A1 | 3/2006 | Crome et al. |
| 2006/0063659 A1* | 3/2006 | Xue ..................... C03C 8/24 429/469 |
| 2006/0127656 A1 | 6/2006 | Gallo et al. |
| 2006/0127749 A1 | 6/2006 | Christie et al. |
| 2006/0191408 A1 | 8/2006 | Gopalan et al. |
| 2006/0236719 A1 | 10/2006 | Lane et al. |
| 2007/0004809 A1 | 1/2007 | Lattner et al. |
| 2007/0039466 A1 | 2/2007 | Nawata et al. |
| 2007/0041894 A1 | 2/2007 | Drnevich |
| 2007/0065687 A1 | 3/2007 | Kelly et al. |
| 2007/0082254 A1 | 4/2007 | Hiwatashi |
| 2007/0104793 A1 | 5/2007 | Akash |
| 2007/0122667 A1 | 5/2007 | Kelley |
| 2007/0137478 A1 | 6/2007 | Stein et al. |
| 2007/0158329 A1 | 7/2007 | Cao |
| 2007/0163889 A1 | 7/2007 | Kato et al. |
| 2007/0212271 A1 | 9/2007 | Kennedy |
| 2007/0029342 A1 | 12/2007 | Cross et al. |
| 2007/0289215 A1 | 12/2007 | Hemmings et al. |
| 2007/0292342 A1 | 12/2007 | Hemmings et al. |
| 2007/0292742 A1 | 12/2007 | Ball et al. |
| 2008/0000350 A1 | 1/2008 | Mundschau et al. |
| 2008/0000353 A1 | 1/2008 | Rarig et al. |
| 2008/0006532 A1 | 1/2008 | Mukundan et al. |
| 2008/0023338 A1 | 1/2008 | Stoots et al. |
| 2008/0029388 A1 | 2/2008 | Elangovan et al. |
| 2008/0047431 A1 | 2/2008 | Nagabhushana |
| 2008/0141672 A1 | 6/2008 | Shah et al. |
| 2008/0142148 A1 | 6/2008 | Nielsen et al. |
| 2008/0168901 A1 | 7/2008 | Carolan et al. |
| 2008/0169449 A1 | 7/2008 | Mundschau |
| 2008/0226544 A1 | 9/2008 | Nakamura |
| 2008/0302013 A1 | 12/2008 | Repasky et al. |
| 2009/0001727 A1 | 1/2009 | De Koeijer et al. |
| 2009/0018373 A1 | 1/2009 | Werth et al. |
| 2009/0023050 A1 | 1/2009 | Finnerty et al. |
| 2009/0029040 A1 | 1/2009 | Christie et al. |
| 2009/0031895 A1 | 2/2009 | Del-Gallo et al. |
| 2009/0084035 A1 | 4/2009 | Wei |
| 2009/0107046 A1 | 4/2009 | Leininger et al. |
| 2009/0120379 A1 | 5/2009 | Bozzuto et al. |
| 2009/0220837 A1 | 9/2009 | Osada |
| 2009/0272266 A1 | 11/2009 | Werth et al. |
| 2010/0015014 A1 | 1/2010 | Gopalan et al. |
| 2010/0074828 A1 | 3/2010 | Singh |
| 2010/0076280 A1 | 3/2010 | Bernstein et al. |
| 2010/0116133 A1 | 5/2010 | Reed et al. |
| 2010/0116680 A1 | 5/2010 | Reed et al. |
| 2010/0122552 A1 | 5/2010 | Schwartz |
| 2010/0143824 A1 | 6/2010 | Tucker et al. |
| 2010/0178219 A1 | 7/2010 | Verykios et al. |
| 2010/0178238 A1 | 7/2010 | Takamura et al. |
| 2010/0193104 A1 | 8/2010 | Ryu et al. |
| 2010/0200418 A1 | 8/2010 | Licht |
| 2010/0203238 A1 | 8/2010 | Magno et al. |
| 2010/0266466 A1 | 10/2010 | Froehlich et al. |
| 2010/0276119 A1 | 11/2010 | Doty |
| 2010/0313762 A1 | 12/2010 | Roeck et al. |
| 2011/0067405 A1 | 3/2011 | Armstrong et al. |
| 2011/0076213 A1 | 3/2011 | Carolan et al. |
| 2011/0111320 A1 | 5/2011 | Suda et al. |
| 2011/0120127 A1 | 5/2011 | Lippmann et al. |
| 2011/0132367 A1 | 6/2011 | Patel |
| 2011/0141672 A1 | 6/2011 | Farley, Jr. et al. |
| 2011/0142722 A1 | 6/2011 | Hemmings et al. |
| 2011/0143255 A1 | 6/2011 | Jain et al. |
| 2011/0180399 A1 | 7/2011 | Christie et al. |
| 2011/0200520 A1 | 8/2011 | Ramkumar |
| 2011/0240924 A1 | 10/2011 | Repasky |
| 2011/0253551 A1 | 10/2011 | Lane et al. |
| 2012/0000360 A1 | 1/2012 | Richet et al. |
| 2012/0067060 A1 | 3/2012 | Greeff |
| 2012/0288439 A1 | 11/2012 | Sundaram et al. |
| 2012/0294783 A1 | 11/2012 | Palamara et al. |
| 2013/0009100 A1 | 1/2013 | Kelly et al. |
| 2013/0009102 A1 | 1/2013 | Kelly et al. |
| 2013/0015405 A1 | 1/2013 | Quintero |
| 2013/0072374 A1 | 3/2013 | Lane et al. |
| 2013/0072375 A1 | 3/2013 | Lane et al. |
| 2013/0156958 A1 | 6/2013 | Belov et al. |
| 2014/0044604 A1 | 2/2014 | Lane et al. |
| 2014/0056774 A1 | 2/2014 | Kelly et al. |

(56) References Cited

U.S. PATENT DOCUMENTS

| | | | |
|---|---|---|---|
| 2014/0060643 | A1 | 3/2014 | Martin et al. |
| 2014/0183866 | A1 | 7/2014 | Kromer et al. |
| 2014/0206779 | A1 | 7/2014 | Lackner |
| 2014/0319424 | A1 | 10/2014 | Chakravarti et al. |
| 2014/0319427 | A1 | 10/2014 | Chakravarti et al. |
| 2014/0323597 | A1 | 10/2014 | Stuckert et al. |
| 2014/0323598 | A1 | 10/2014 | Chakravarti et al. |
| 2014/0323599 | A1 | 10/2014 | Chakravarti et al. |
| 2015/0096506 | A1 | 4/2015 | Kelly et al. |
| 2015/0098872 | A1 | 4/2015 | Kelly et al. |
| 2015/0226118 | A1 | 8/2015 | Kelly et al. |
| 2015/0328582 | A1 | 11/2015 | Joo et al. |

FOREIGN PATENT DOCUMENTS

| | | | | |
|---|---|---|---|---|
| EP | 0926096 | A1 | | 6/1999 |
| EP | 0984500 | A2 | | 3/2000 |
| EP | 0989093 | A2 | | 3/2000 |
| EP | 1504811 | A1 | | 2/2005 |
| EP | 1717420 | A1 | | 11/2006 |
| EP | 1743694 | A1 | | 1/2007 |
| EP | 2 098 491 | A1 | | 9/2009 |
| EP | 2873451 | A1 | | 5/2015 |
| GB | 688657 | | | 3/1953 |
| GB | 689522 | | | 4/1953 |
| GB | 697377 | | | 9/1953 |
| GB | 713553 | | | 11/1954 |
| GB | 1199483 | | | 7/1970 |
| GB | 1312700 | A | * | 4/1973 ......... C03C 10/0027 |
| GB | 1348375 | | | 3/1974 |
| JP | 56-136605 | | | 10/1981 |
| WO | WO 98/42636 | | | 10/1998 |
| WO | WO 0017418 | | | 3/2000 |
| WO | WO 01/09059 | A1 | | 2/2001 |
| WO | WO 2004/063110 | A2 | | 7/2004 |
| WO | WO 2006/064160 | A1 | | 6/2006 |
| WO | WO 2007060141 | | | 5/2007 |
| WO | WO 2007/092844 | A2 | | 8/2007 |
| WO | WO 2007086949 | | | 8/2007 |
| WO | WO 2008024405 | | | 2/2008 |
| WO | WO 2010052641 | A2 | | 5/2010 |
| WO | WO 2011083333 | A1 | | 7/2011 |
| WO | WO 2011/121095 | A2 | | 10/2011 |
| WO | WO 2012118730 | | | 9/2012 |
| WO | WO 2013009560 | A1 | | 1/2013 |
| WO | WO 2013062413 | A1 | | 5/2013 |
| WO | WO 2013089895 | A1 | | 6/2013 |
| WO | WO 2014/049119 | A1 | | 4/2014 |
| WO | WO 2014074559 | A1 | | 5/2014 |
| WO | WO 2014077531 | A1 | | 5/2014 |
| WO | WO 2014107707 | A2 | | 7/2014 |
| WO | WO 2014/160948 | A1 | | 10/2014 |
| WO | WO 2014176022 | A1 | | 10/2014 |

OTHER PUBLICATIONS

David Studer; Demonstration of a cylinder fill system based on solid electrolyte oxygen separator (SEOS) technology, Early field assessment at a USAF maintenance facility, (Air Products & Chemicals Inc.); AFRL-RH-BR-TR-2010-0046; Jun. 2010.

Zhu et al.; Development of Interconnect Materials for Solid Oxide Fuel Cells; Materials Science and Engineering A348, Apr. 23, 2002, pp. 227-243.

Lee Rosen et al.; "Development of Oxygen Transport Membranes for Coal-Based Power Generation"; ScienceDirect (Available online at www.sciencedirect.com); Energy Procedia 4 (2011) pp. 750-755.

F. Bidrawn et al., "Efficient Reduction of C02 in a Solid Oxide Electrolyzer" Electrochemic and Solid State Letters, vol. 11, No. 9, Jun. 20, 2008, pp. B167-B170, XP002644615, col. 1, 2.

Ebbesen et al., "Electrolysis of carbon dioxide in Solid Oxide Electrolysis Cells", Journal of Power Sources, Elsevier SA, CH, vol. 193, No. 1, Aug. 1, 2009, pp. 349-358, XP026150424, ISSN: 0378-7753, DOI: 10.1016/J. JPOWSOUR. 2009. 02. 093.

The U.S. Department of Energy, "Evaluation of Fossil Fuel Power Plants with C02 Recovery", Final Report (2002).

The U.S. Department of Energy—Office of Fossil Energy and U.S. Department of Energy/NETL, "Evaluation of Innovative Fossil Fuel Power Plants with C02 Removal", Interim Report (Dec. 2000).

Sylvain Deville; "Freeze-Casting of Porous Ceramics: A Review of Current Achievements and Issues"; Advanced Engineering Materials 2008, 10, No. 3, pp. 155-169.

Neville Holt, "Gasification Process Selection—Trade-offs and Ironies", Presented at the Gasification Technologies Conference 2004, Oct. 3-6, 2004 JW Marriott Hotel, Washington, DC, pp. 1-10.

Friedemann Marschner et al., "Gas Production", Ullmann's Encyclopedia of Industrial Chemistry, Jun. 15, 2000, pp. 1-21, XP002253967.

Dyer et al., "Ion Transport Membrane Technology for Oxygen Separation and Syngas Production", Solid State Ionics 134 (2000) p. 21-33.

Andrea Montebelli et al., "Methods for the catalytic activation of metallic structured substrates", Catalysis Science & Technology, 2014, pp. 2846-2870.

Joseph J. Beaman, D.Sc.; "Oxygen Storage on Zeolites"; Prepared by USAF School of Aerospace Medicine, Human Systems Divisions (AFSC), Brooks Air Force Base, TX 78235-5301; USAFSAM-TR-88-26; AD-A209 352; pp. 1-77; Jan. 1989.

Radtke et al., "Renaissance of Gasification based on Cutting Edge Technologies", VGB PowerTech (2005), XP-001235150, pp. 106-115.

L. N. Protasova et al., "Review of Patent Publications from 1990 to 2010 on Catalytic Coatings on Different Substrates, Including Microstructured Channels: Preparation, Deposition Techniques, Applications", Recent Patents on Chemical Engineering, 2012, pp. 28-44.

Zhimin Zhong, "Stoichiometric lanthanum chromite based ceramic interconnects with low sintering temperature", Solid State of Ionics, North Holland Pub. Company, Amsterdam, NL, vol. 177 No. 7-8, Mar. 15, 2006, pp. 757-764, XP027895768,ISSN: 0167-2738.

Babcock & Wilcox, Steam 40, "Sulfur Dioxide Control" (1992), pp. 35-1-35-15.

M.F. Lu et al., Thermomechanical transport and anodic properties of perovskite-type (LaSr) CrFeO, Journal of Power Sources, Elsevier SA, CH, vol. 206, Jan. 15, 2012, pp. 59-69, XP028403091.

Okawa et al., Trial Design for a C02 Recovery Power Plant by Burning Pulverized Co in 02/C02, Energy Convers. Mgmt., vol. 38, Supplement (1997) pp. S123-S127.

Ciacchi et al., "Tubular zirconia-yttria electrolyte membrane technology for oxygen separation", Solid State Ionics 152-153, 2002, pp. 763-768.

Jian-jun Liu, Tong Liu, Wen-dong Wang, Jian-feng Gao, Chu-sheng Chen; Zr0.84Y0.16O1.92-La0.8Sr0.2Cr0.5Fe0.5O3-8 dual-phase composite hollow fiber membrane targeting chemical reactor applications; Journal of Membrane Science 389 (2012) 435-440.

M. Solvang, K.A. Nielsen, and P.H. Larsen, "Optimization of Glass Ceramic Sealant for Intermediate Temperature Solid Oxide Fuel Cells", Jan. 1, 2005, XP055352985, Retrieved from the Internet: URL:http://ma.ecsdl.org/content/MA2005-01/30/1206.full.pdf on Mar. 8, 2017.

VDM Crofer et al., "Material Data Sheet No. 4046 May 2010 Edition", Jan. 1, 2010, XP055353076, Retrieved from the Internet: URL:http://www.vdm-metals.com/fileadmin/user_upload/Downloads/Data_Sheets/Data_Sheet_VDM_Crofer_22_APU.pdf retrieved on Mar. 9, 2017.

* cited by examiner

METHOD FOR SEALING AN OXYGEN TRANSPORT MEMBRANE ASSEMBLY

CROSS REFERENCE TO RELATED APPLICATIONS

This application claims priority to and the benefit of U.S. provisional patent application Ser. Nos. 61/739,403 filed on Dec. 19, 2012.

U.S. GOVERNMENT RIGHTS

This invention was made with Government support under Cooperative Agreement No. DE-FC26-07NT43088, awarded by the United States Department of Energy. The Government has certain rights in this invention.

FIELD OF THE INVENTION

The present invention provides an improved or enhanced method of providing a gas-tight seal between a first ceramic part and a second ceramic, metal, ceramic coated metal or cermet part wherein such sealed assembly is useful in high temperature and severe environment applications such as oxygen transport membrane applications. More particularly, the improved sealing method involves the use of an $Al_2O_3$ and $SiO_2$ based glass-ceramic bond agent subjected to customized temperature profiles including rapid heating and rapid cooling at temperature ramp rates ≥100° C. per minute to alter the macrostructure of the glass-ceramic seal being formed.

BACKGROUND

Joining of ceramic materials to other ceramic materials or to a metal component has been a long standing problem. This problem is particularly troublesome where the joining technique is required to form a gas-tight or hermetic seal between the adjoining ceramic materials or the ceramic-metal components. Ceramic joining is typically accomplished when forming seals between the adjoining ceramic parts or forming seals between a ceramic and a metal part. The preferred ceramic joining techniques are brazing, glass fritting and diffusion bonding techniques. While such techniques are relatively common in many industrial applications, the seals are often unsuitable for use in severe operating conditions (e.g. high temperature and high pressure) typically associated with an oxygen transport membrane applications. In addition, as such techniques involve slowly heating the adjoining materials to temperatures ranging from about 400° C. to 1200° C. or higher, the large differences in thermal expansion between metals and ceramics make joining of a ceramic part to a metal part using these conventional techniques even more challenging. To that end, new glass-ceramic seal materials are currently being investigated for use in oxygen transport membrane applications and other severe operation applications.

Conventional techniques, such as diffusion bonding techniques, typically use radiant heating methods to effect the joining of parts and so the cycle times required to reach the target temperatures as well as the bonding time at the target temperature can be quite long, typically on the order of multiple hours, particularly where the bonding process is conducted at temperatures approaching 1600° C.

However, none of the aforementioned ceramic joining techniques are effective for producing high performance hermetic seals that are capable of functioning in severe environment applications. Accordingly, there is a need for improvements and modifications to these existing methods of joining ceramic parts and methods of joining ceramics to metals to make high performance hermetic seals and/or joints that are capable of functioning in high temperature and high pressure applications, such as applications involving oxygen transport membranes and solid oxide fuel cells where seals are often subjected to high temperatures in excess of 800° C. and pressures in excess of 100 psi.

An alternative joining process that is suitable for many ceramic materials is an infiltration joining process. In the infiltration joining processes, a mixture of polymer precursor, aluminum, boron and silicon is applied to the joint surfaces in the form of a paste, slurry, tape, film or ribbon and then heated in an inert atmosphere in a furnace. The joint forms through pyrolysis of the carbon-containing polymer precursor material, which subsequently reacts with the silicon in the presence of the aluminum and/or boron sintering aids to form an in-situ, high density silicon carbide. While the infiltration joining process shows promise in the field of ceramic joining, the durability and performance of such seals as well as the cycle time required to form the seal are not yet optimized.

The present invention provides an improved or enhanced method of sealing a first ceramic part to a second solid part made of ceramic, metal, cermet or a ceramic coated metal that overcomes the above-identified problems.

SUMMARY OF THE INVENTION

The present invention may be characterized as a method of sealing a first ceramic part to a second solid part configured to receive the first ceramic part, the method comprising the steps of: (i) placing a bond agent comprising a glass-ceramic material and organic material on one or more adjoining surfaces of the first ceramic part and the second solid part; (ii) heating the first ceramic part, the second solid part and the bond agent to remove or dissolve the organic material; (iii) further heating the first ceramic part and the second solid part at a rate of greater than about 100° C. per minute to temperatures where the glass-ceramic material reacts with carbon from the organic binder material and the glass-ceramic material flows into or wets the interface between adjoining surfaces of the first ceramic part and the second solid part; and (iv) cooling the first ceramic part and the second solid part at a cooling rate of greater than about 100° C. per minute to nucleate and re-crystallize the glass-ceramic material and form a hermetic or gas-tight seal between the first ceramic part and the second solid part.

In another aspect, the present invention may be characterized as a product by process wherein the product is a hermetic or gas-tight seal in an oxygen transport membrane device. The hermetic or gas-tight seal is created between a first ceramic part and a second solid part and is formed by the process comprising the steps of: (i) placing a glass-ceramic bond agent on one or more adjoining surfaces of the first ceramic part and the second solid part to form an assembly; (ii) heating the assembly to remove any organic material present in the bond agent; (iii) further heating the assembly at a rate of greater than about 100° C. per minute to temperatures effective to flow and wet the glass-ceramic material into the interface between adjoining surfaces of the first ceramic part and the second solid part; and (iv) cooling the assembly at a rate of greater than about 100° C. per minute to nucleate and re-crystallize the glass-ceramic material and form the hermetic or gas-tight seal between the first ceramic part and the second solid part.

In either of the above characterizations, the glass-ceramic bond agent may be a paste, slurry, film, ribbon, or tape that is placed or disposed on one or more adjoining surfaces of the first ceramic part and the second solid part. The glass-ceramic portion of the bond agent may comprises a blend of $Al_2O_3$ and $SiO_2$ together with BaO, SrO, CaO, MgO or combinations thereof and the volumetric ratio of the glass-ceramic material to the organic material is between about 4:1 and about 1.5:1.

Likewise, in either of the above characterizations, cooling the assembly (i.e. first ceramic part and the second solid part) may ideally be carried out at a cooling rate of between about 120° C. per minute to about 160° C. per minute, whereas heating the assembly may be ideally carried out at a temperature ramp rate of between about 200° C. per minute to about 250° C. per minute. Optionally, the assembly may be held or maintained at predetermined target temperatures for a prescribed duration of time, generally between about 30 seconds to about 360 seconds. Maintaining or holding the temperature at said predetermined target temperatures is generally to be effected either between or during the heating and cooling steps.

The first ceramic part may be a tubular ceramic oxygen transport membrane whereas the second solid part is an adaptor or connector configured to receive the end of the tubular oxygen transport membrane. The second solid part may be a ceramic component, a ceramic coated metal component, a metal component or a cermet component. In the case of a metal component or a ceramic coated metal component, it may be advisable to forming a plurality of slots, grooves, or apertures in or through the metal part support; wherein during the heating of the assembly the glass-ceramic material flows into the gaps or spaces created by the formed slots and during the cooling process the glass-ceramic material re-crystallizes in the gaps or spaces.

Unlike the prior art glass-ceramic sealing methods, the present method of sealing a first ceramic part to a second solid part achieves a gas-tight or hermetic seal that is suitable for use in harsh or severe environments such as an oxygen transport membrane application. By rapidly heating and rapidly cooling the sealed assembly at temperature ramp rates greater than or equal to about 100° C. per minute, the macrostructure of the glass-ceramic seal being formed is altered to provide a dense, strong, durable and gas-tight seal needed for such applications.

BRIEF DESCRIPTION OF THE DRAWINGS

While the specification concludes with claims distinctly pointing out the subject matter that applicants regard as their invention, it is believed that the invention will be better understood when taken in connection with the accompanying drawings in which:

DETAILED DESCRIPTION

Figure 1:
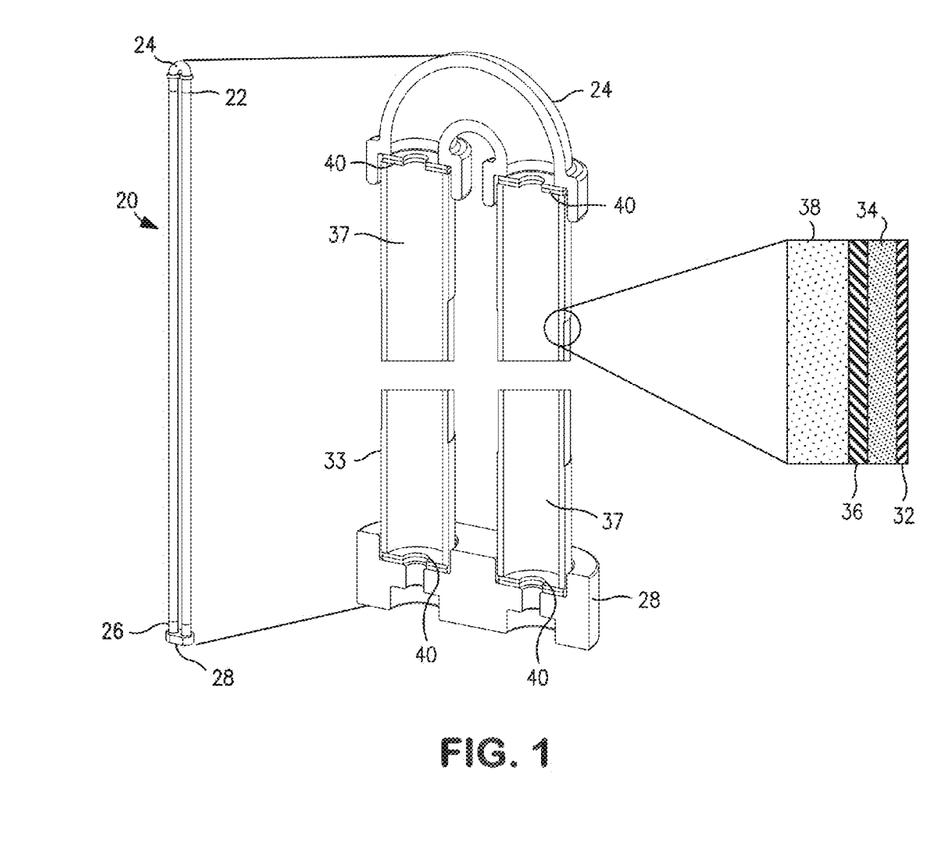
FIG. 1 is a schematic illustration of an oxygen transport membrane assembly with an close-up cut away view of a pair of ceramic oxygen transport membrane tubes sealably connected to an adaptor and connector.

Turning to FIG. 1, there is shown an oxygen transport membrane assembly 10 including an arrangement of a pair of tubular oxygen transport membranes 20 connected at one end 22 by a "U" shaped pipe-like adaptor 24 or bend and connected at the other end 26 to a manifold (not shown) via a thru-block connector 28. An important characteristic of the tubular oxygen transport membranes 20 is that they are comprised of a multilayered structure comprising a porous surface exchange layer 32; a mixed phase oxygen ion conducting dense ceramic separation layer 34; an intermediate porous layer 36; and a porous support 38.

The dense ceramic separation layer 34 is capable of conducting oxygen ions and electrons to separate oxygen from an oxygen containing feed and preferably comprises a mixture of a fluorite structured ionic conductive material and electrically conductive perovskite materials to conduct the oxygen ions and electrons, respectively. The porous surface exchange layer 32 or air activation layer is disposed on the outer surface of the oxygen transport membrane tube adjacent to the dense ceramic separation layer. The porous surface exchange layer 32 preferably has a porosity of between about 30 and 60 percent functions to ionize some of the oxygen in the feed. The oxygen that is not ionized at and within the porous surface exchange layer 32 will typically ionize at the adjacent surface of the dense ceramic separation layer 32.

The porous support layer 38 is disposed on the inner surface of the oxygen transport membrane tube and is comprised of a fluorite structured ionic conducting material having a porosity of greater than about 20 percent and a microstructure exhibiting substantially uniform pore size distribution. The intermediate porous layer 36 is often referred to as a fuel oxidation layer and is disposed between the dense ceramic separation layer 34 and the porous support 38. Like the dense separation layer 32, the intermediate porous layer 36 is also capable of conducting oxygen ions and electrons to separate the oxygen from an oxygen containing feed.

In the illustrated embodiment, the "U" shaped pipe-like adaptor 24 and thru-block connector 28 are fabricated from dense ceramic materials (e.g. 3 mol % yttria stabilized zirconia or MgO—$MgAl_2O_4$) and have similar thermal expansion characteristics to the oxygen transport membrane tubes 20, in particular to the thermal expansion characteristics of the porous support 38.

When a partial pressure difference of oxygen is applied on opposite sides of a membrane, oxygen ions will ionize on one surface of the membrane and emerge on the opposite side of the membrane and recombine into elemental oxygen. The free electrons resulting from the combination will be transported back through the membrane to ionize the oxygen. The partial pressure difference can be produced by providing the oxygen containing feed to the membrane at a positive pressure or by supplying a combustible substance to the side of the membrane opposing the oxygen containing feed or a combination of the two methods.

In the illustrated embodiment, the oxygen containing feed is contacted on the retentate side or outer surface 33 of the tubular composite oxygen transport membrane 20 where it contacts the porous surface exchange layer 32 which ionizes some of the oxygen. As indicated above, Oxygen is also ionized at the adjacent surface of the dense ceramic separation layer 34. The oxygen ions are transported through the dense ceramic separation layer 34 to intermediate porous layer 36 to be distributed to the pores of the porous support 38. Some of the oxygen ions, upon passage through the dense ceramic separation layer 34 will recombine into elemental oxygen. The recombination of the oxygen ions into elemental oxygen is accompanied by the loss of electrons that flow back through the dense ceramic separation layer to ionize the oxygen at the opposite surface.

At the same time, a combustible substance, for example a hydrogen and carbon monoxide containing synthesis gas, is contacted on the permeate side or inner surface 37 of the tubular oxygen transport membrane 20. The combustible substance enters the pores of the porous support 38, contacts the transported oxygen and burns through combustion supported by the transported oxygen. Optionally, the combustion may be further promoted by a catalyst that may be present in the form of catalyst particles incorporated into the porous support. The presence of combustible fuel on the permeate side 37 of the oxygen transport membrane 20, provides a lower partial pressure of oxygen. This lower partial pressure drives the oxygen ion transport as discussed above and also generates heat to heat the dense ceramic separation layer 34, the intermediate porous layer 36 and the porous surface exchange layer 32 up to an operational temperature at which the oxygen ions will be conducted.

In order to operate effectively and at commercial scale, such oxygen transport membrane based systems typically require a plurality of connected oxygen transport membrane tubes. In addition, the gas flows on the permeate side 37 and retentate side 33 of the oxygen transport membrane tubes must be effectively sealed from one another with a gas-tight or hermetic seal. To achieve such gas-tight seals, the ends of the tubular oxygen transport membranes 20 are connected to a "U" shaped pipe-like adaptor 24 by using a glass-ceramic based seal formed using a bond agent preferably comprising a glass ceramic material and organic material. The other end of the tubular oxygen transport membranes 20 are connected to a manifold (not shown) via a thru-block connector 28. Specifically, the bond agent includes a baria-alumina-silcate glass-ceramic powder and an organic binder mixed together using various solvents and cast into a tape, ring or ribbon. In the illustrated embodiment, a glass-ceramic based bond agent is formed into a ring shape element 40 and interposed between adjoining surfaces of the oxygen transport membrane 20 and the U-shaped pipe-like adaptor 24 or thru-block connector 28.

In the preferred embodiment, the high temperature glass-ceramic based bond agent is fabricated using about 1500 grams of the glass-ceramic powder having a density of about 0.98 grams/cc and 202.9 grams of organic binder materials having a overall density of about 3.89 grams/cc resulting in a bond agent having roughly 65% by volume glass-ceramic material and 35% by volume of organic material. The preferred organic material used in fabricating the present bond agent is a combination of Phosphate Ester (Emphos PS236); Polyvinyl Butyrai (Butvar B-79); and Butyl Benzyl Phthalate.

The preferred glass-ceramic powder is preferably a blend of $Al_2O_3$, and $SiO_2$ together with BaO, SrO, CaO, MgO or combinations thereof, commercially available from Ceradyne-Viox as G9 Glass Powder V2767. The G9 Glass Powder includes roughly between about 2 mol % to about 15 mol % of $Al_2O_3$; between about 40 mol % to about 70 mol % of $SiO_2$; and between about 20 mol % to 55 mol % of BaO, SrO, CaO, MgO, or combinations thereof. Optionally, the glass-ceramic material may further contain other additives or modifiers such as metal oxides including, but not limited to, $ZrO_2$, $TiO_2$, $Cr_2O_3$, and combinations thereof to modify the properties of the glass phase or the final crystallized seal. Such modified properties may include wetting characteristics, glass transition temperature, glass softening temperature, and thermal expansion coefficient.

The resulting glass-ceramic material preferably has a coefficient of thermal expansion that closely approximates the coefficient of thermal expansion of the tubular oxygen transport membrane 20 and the adaptor 24 or connector 28 to which it is joined. For example, if the coefficient of thermal expansion for the resulting glass-ceramic material is within about 30% or less of the coefficient of thermal expansion of the parts to be joined, one could consider that a close approximation. As indicated above, the U-shaped pipe-like adaptor 24 and the thru-block connector 28 are preferably ceramic components, although metal components, ceramic coated metal components or cermet components can be used.

While the above-identified glass-ceramic sealing materials are generally known to those skilled in the art and are generally disclosed in U.S. Pat. Nos. 6,430,966 and 6,532,769; such glass-ceramic seals have heretofore been unable to produce high performance gas-tight or hermetic seals needed in many high temperature oxygen transport membrane applications. As clearly stated in these related art references, the formed seals had an oxygen leak rate of about $3.7 \times 10^{-5}$ standard cubic centimeters per sec which is not considered a gas-tight or hermetic seal.

To overcome these deficiencies in the glass-ceramic sealing materials, an enhanced or improved method of sealing has been developed using these same glass-ceramic materials. This enhanced or improved method of sealing ceramic parts includes preparing a bond agent comprising the glass-ceramic materials and organic material, the glass-ceramic material preferably comprising the known blend of $Al_2O_3$ and $SiO_2$ together with BaO, SrO, CaO, MgO or combinations thereof. Preferably, the volumetric ratio of the glass-ceramic material to the organic material is between about 4:1 and about 1.5:1, and more preferably as indicated above, the bond agent is about 65% by volume glass-ceramic material and 35% by volume of organic material.

The glass-ceramic based bond agent is then placed or disposed on one or more adjoining surfaces of the first ceramic part (i.e. oxygen transport membrane tube) and the second part (i.e. adaptor or connector) to form an assembly. The assembly, including the first ceramic part, the second solid part, and glass-ceramic based bond agent, is then heated to a temperature that removes or dissolves the organic binder material from the bond agent. The initial heating step is preferably performed using an induction heating furnace or element at a temperature ramp rate of greater than about 100° C. per minute to raise the temperature of the assembly from about room temperature to a first target temperature of between about 400° C. and 500° C. Optionally, the assembly may be held at this first target temperature for a predetermined temperature soak time, generally for 60 seconds or less.

The assembly is then subjected to a second or further induction heating step at a high temperature ramp rate of greater than about 100° C. per minute, and more preferably between about 100° C. per minute and 200° C. per minute to temperatures where the glass-ceramic material starts to soften and undergo phase reactions, including reactions of the glass-ceramic material with carbon from the organic binder material to form silicon carbides. In particular, the second or further heating step continues until the assembly reaches a second target temperature where the glass-ceramic material flows and wets the interface between adjoining surfaces of the first ceramic part and the second part. Optionally, the assembly may be held at this second target temperature for a predetermined temperature soak time, generally between about 180 and 360 seconds.

Finally, the assembly is rapidly cooled or quenched at a cooling rate of greater than about 100° C. per minute, and more preferably at a rate of about 140° C. per minute or more to induce nucleation and re-crystallization of the glass-ceramic material to form a dense, durable and gas-tight seal.

Figure 3A:
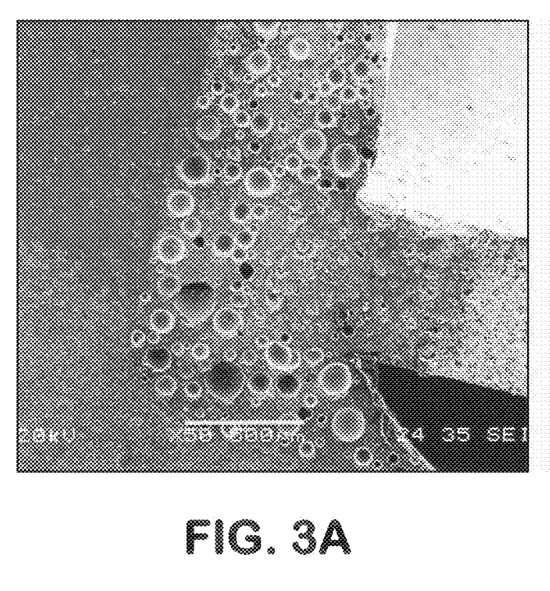
FIGS. 3A and 3B are 50× images of a glass-ceramic seal made using conventional joining methods.
Figure 3B:
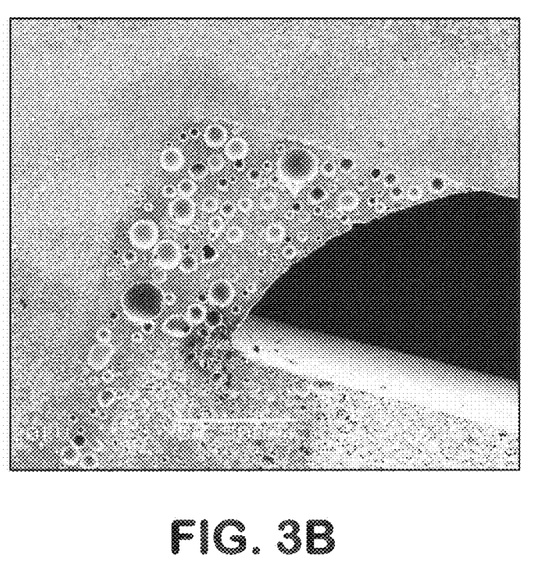

These rapid secondary heating and rapid cooling steps (i.e. at high temperature ramp rates ≥100° C. per minute) changes or alters the macrostructure of the glass seals being formed. Using the conventional slower temperature ramp rates for the secondary heating and cooling steps as disclosed in the prior art, the macroscopic nature of the glass-ceramic reveals comparatively larger pores distributed throughout the entire bulk material of the seal, as generally shown in FIGS. 3A and 3B. Conversely, as shown in FIGS. 4A and 4B, when using the rapid secondary heating and rapid cooling temperature profiles, the pores in the resulting seal are generally fewer and smaller than the pores associated with the conventional slower temperature ramp rates.

Figure 4A:
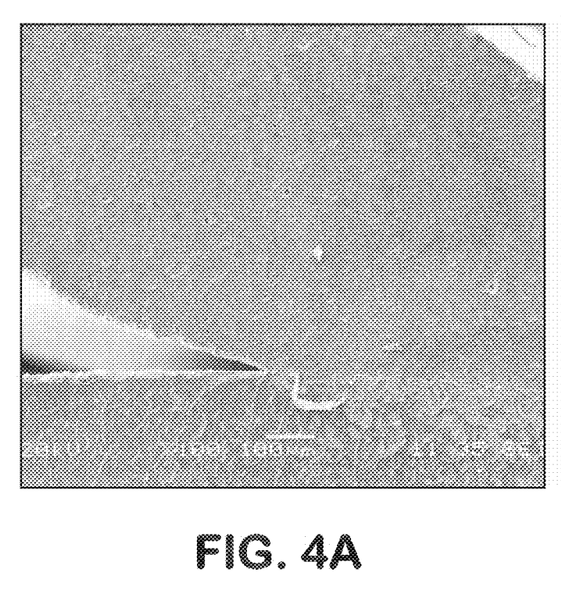
FIGS. 4A and 4B are 100× images of a glass-ceramic seal made using the joining method in accordance with the present invention.
Figure 4B:
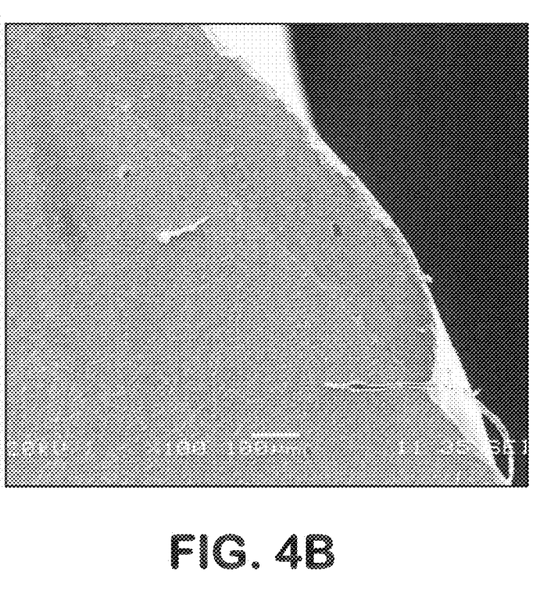

Advantageously, the present glass-ceramic seal with the fewer pores and smaller pores shown in FIGS. 4A and 4B forms a stronger and tougher seals which translates to a significantly higher acceptance rate or yield for the manufactured oxygen transport membrane assemblies or modules (i.e. 50% to 90%) shown in FIG. 1 compared to the acceptance rate or yield for manufactured oxygen transport membrane assemblies or modules using the prior art sealing techniques (i.e. 10% to 20% yield). More importantly, from a comparative standpoint, the present glass-ceramic seal with the fewer pores and smaller pores is also a more hermetic seal having lower measured helium leak rates with estimated values around $1 \times 10^{-9}$ cc per second. The porous seals shown in FIGS. 3A and 3B tended to have higher measured helium leak rates with estimated values around $1 \times 10^{-5}$ cc per second.

Use of an induction heating technique with a high temperature metal susceptor in lieu of traditional radiant heating techniques has lead to further reductions in cycle time for the present seal forming method as well as increased space for fixturing and alignment. Advantageously, the induction heating process using a metal susceptor allows precise control of the complex heating and cooling temperature profiles and also provides reliable, repeatable, non-contact heating of the assembly in a minimal amount of time.

As described above, it is possible to make a gas-tight connection or seal directly between a ceramic oxygen transport membrane tube and a metal part, such as the illustrated metal connector, using the improved glass-ceramic sealing method described herein. However, in view of the greater difference in thermal expansion between the ceramic and metal parts, an area of high stress is likely to be created near the formed glass seal or proximate the sealing area. This added stress proximate the seal formed between a ceramic oxygen transport membrane tube and a metal connector can increase the number of premature failures of the ceramic tube assemblies which typically arise during the installation process or during thermal cycling of the oxygen transport membrane systems.

To mitigate the problems associated the high stress areas in ceramic-metal joints or seals, the use of a dense ceramic adaptor disposed between the active ceramic oxygen transport membrane tube and the metal connector is suggested. The dense ceramic adaptor preferably has a coefficient of thermal expansion that is matched or closely matched to the coefficient of thermal expansion of the ceramic tubular oxygen transport membrane. More importantly, the dense ceramic adaptor is designed so as to absorb much of the stress that is caused by the differential thermal expansion characteristics between the ceramic part and metal connector.

A further method to mitigate the problems associated with the high stress areas proximate the ceramic seals is to form a plurality of radial slots, grooves, or apertures in or through the walls of the metal connector or other metal part proximate the area of the glass-ceramic seal. By forming a plurality of slots, grooves, or apertures in the metal part radially disposed around the glass-ceramic sealing area, the glass-ceramic sealing material will tend to flow into the gaps or spaces created by the formed slots, grooves or apertures when the assembly is rapidly heated to the high temperatures required for glass-ceramic sealing and the metal part is expanded.

Upon the rapid cooling of the assembly, the sealing material re-crystallizes in such gaps or spaces which would typically interfere with the contraction of the metal during the cooling process, which in turn transfers a portion of the stress from the sealing surface between the dense ceramic adapter and the metal connector to the glass-ceramic seal material in the gaps and spaces of the metal connector. As the metal connector absorbs a portion of the stress, the metal connector undergoes a slight deformation at or near the glass filled gaps thereby preventing the undesired brittle failures of the ceramic part. The stress induced deformation of the metal part does not generally affect the hermeticity of the formed seal.

Figure 2:
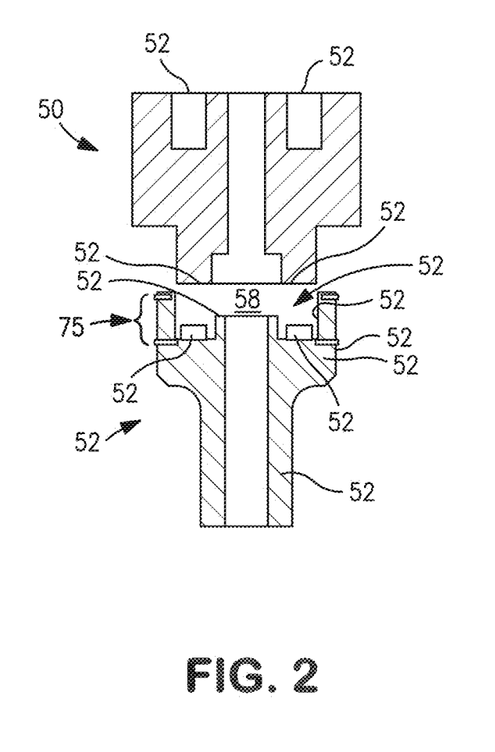
FIG. 2 is a schematic illustration of a ceramic oxygen transport membrane assembly sealably connected to a metal connector in accordance with another embodiment of the present invention.

Turning now to FIG. 2, there is shown a cross section illustration of a seal area between a ceramic membrane adaptor 50 and a metal connector 60 that employs the present method of sealing. Although not shown, of the illustrated ceramic membrane adaptor 50 is preferably sealed to a ceramic tubular oxygen transport membrane using the improved glass-ceramic sealing method described herein. However, as discussed above, creating a strong, durable and hermetic seal between a ceramic part such as the ceramic membrane adaptor 50 and a metal part such as the metal connector 60 is more challenging due to the differences in thermal expansion characteristics between the parts. In the illustrated arrangement, the gas-tight seal is formed between the ceramic membrane adaptor 50 and a metal connector 60.

The ceramic membrane adaptor 50 is a tubular shaped adaptor that includes a first female end 52 configured to receive a ceramic oxygen transport membrane tube (not shown) and a second male end 54 is configured to engage a corresponding female end 62 of the metal connector 60. The ceramic membrane adaptor 50 also defines a central bore 55 running between the first female end 52 and second male end 54 and that communicates with the interior of the oxygen transport membrane tube. In the illustrated embodiment, the central bore 55 further defines an interior shoulder 57 configured to receive and hold a corresponding structure protruding from the metal connector 60.

The metal connector 60 is also a tubular shaped structure that has an annular coupling portion 64 at a female end 62 that operatively engages with the male end 54 of the ceramic adaptor 50. As seen in FIG. 2, the annular coupling portion 64 includes a base 61, an annular sheath structure 70 and a centrally disposed raised protrusion 77. The metal connector also includes a neck portion 66 extending from the annular coupling portion 64 to the other end 68 with a bore 75 that runs through a central axis of the tubular shaped metal connector 60.

The centrally disposed raised protrusion 77 is configured to align and abut with the interior shoulder 57 of the ceramic membrane adaptor 50. The annular sheath structure 70 is configured to slide over and cover the male end 54 of the ceramic membrane adaptor 50 when the two parts are engaged. The annular sheath structure 70 has an interior surface 72 adjacent to the sealing area and an exterior surface 74. As described in more detail below, the annular sheath structure 70 includes a plurality of slots 75 extending from the interior surface 72 to the exterior surface 74 that are radially spaced around the circumference of the annular sheath structure 70.

A glass ceramic bond agent 56, as described above, is placed at or near the interface 58 of the ceramic adaptor 50 and the metal connector 60, and more particularly proximate the annular sheath structure. When heated according to the process described herein, the glass-ceramic material flows into or wets the interface between adjoining surfaces of the ceramic membrane adaptor 50 and the metal connector 60 as well as into the slots 75 in the annular sheath structure.

EXAMPLES

The following examples, disclose the making and use of a glass-ceramic based bond agent used to join the oxygen transport membrane tubes to the U shaped pipe-like adaptor at one end of the oxygen transport membrane tubes and to a gas manifold via a thru-block connector at the other end of the oxygen transport membrane tubes. The preferred glass-ceramic bond agent and resulting seal also requires a coefficient of thermal expansion that is close to or approximates the coefficient of thermal expansion of the components to be joined.

For all examples, the bond agent was prepared by dissolving 12.8 grams of a phosphate ester (Emphos PS236) in a solvent comprising 337.7 grams of methyl ethyl ketone and 82.4 grams of ethyl alcohol (95%) and added to a jar containing 1000 grams of 0.5 inch diameter Burundum (96% $Al_2O_3$) milling media. About 1500 grams of Viox G9 Glass Powder (V2767) was then added and the solution was dispersion milled for about 24 hours. A plasticizer and binder were then added to the dispersion and subsequently mixed on rollers for another 24 hours. Specifically, the plasticizer and binder in the preferred embodiment included 101.9 grams of Polyvinyl Butyrai (Butvar B-79) and 88 grams of Butyl Benzyl Phthalate. The resulting slurry was placed in containers and de-aired for about 8 minutes in a vacuum at 25" Hg and then filtered through nylon mesh cloth with 150 micron openings. The final bond agent was then cast into a tape having a nominal thickness of about 0.020 and 8 inch width.

The bond agent tape was disposed on adjoining surfaces of a tubular oxygen transport membrane having a dense 3YSZ dense layer and a dense 3YSZ ceramic adaptor configured to receive an end of the tubular oxygen transport membrane. The assembly of tubular oxygen transport membrane, ceramic adaptor and glass-ceramic bond agent was subjected to various temperature cycling profiles including one or more heating steps to remove or dissolve the organic binder from the tape and soften or melt the bond agent so as to react the silicon in the glass-ceramic material with residual carbon from the organic materials in the bond agent. The temperature cycling profiles also included one or more cooling steps to induce nucleation and re-crystallization of the glass-ceramic to form a seal adjoining surfaces of the tubular oxygen transport membrane and ceramic adaptor.

For purposes of comparison, the original recommended temperature cycling profiles for making seals using the G9 Glass Powders involved heating the assembly in a furnace at 0.5° C./min from room temperature to about 350° C. and upon reaching the 350° C. target temperature, soaking the assembly at 350° C. for about 60 minutes. This was followed further heating of the assembly at a temperature ramp rate of about 5° C./min to 1200° C. and temperature soaking the assembly at 1200° C. for another 30 minutes. Finally, the assembly was cooled from 1200° C. to room temperature at a cooling rate of 5° C./min to form the glass-ceramic seal. The entire cycle time lasted approximately 20 hours.

Example 1

Example 1 provides a baseline temperature cycling profiles for the joining or sealing of an oxygen transport membrane tube to an adaptor or connector. The baseline temperature cycling profiles of Example 1 are shown graphically in FIG. 5 and FIG. 6. As seen therein, the initial heating of the tube/adaptor/bond agent assembly was performed using an induction heating furnace at a temperature ramp rate of about 170° C./min to raise the assembly temperature from about 25° C. to 450° C. and without temperature soaking. The initial heating of the assembly continued at 170° C./min until reaching a first target temperature of about 835° C. This was followed further secondary heating of the assembly in three successive increments of 120 seconds each at different temperature ramp rates, including a ramp rate of 83° C./min to a temperature of 990° C.; a ramp rate of 46° C./min to a temperature of 1082° C.; and a ramp rate of 25° C./min to a max temperature of 1131° C. Finally, the assembly was cooled from 1131° C. to 984° C. at a cooling rate of about 49° C./min to re-crystallize the glass-ceramic seal. The resulting glass-ceramic seal was porous and had physical characteristics similar to those shown in FIGS. 3A and 3B. The entire cycle time lasted about 16 minutes.

Example 2

Figure 5:
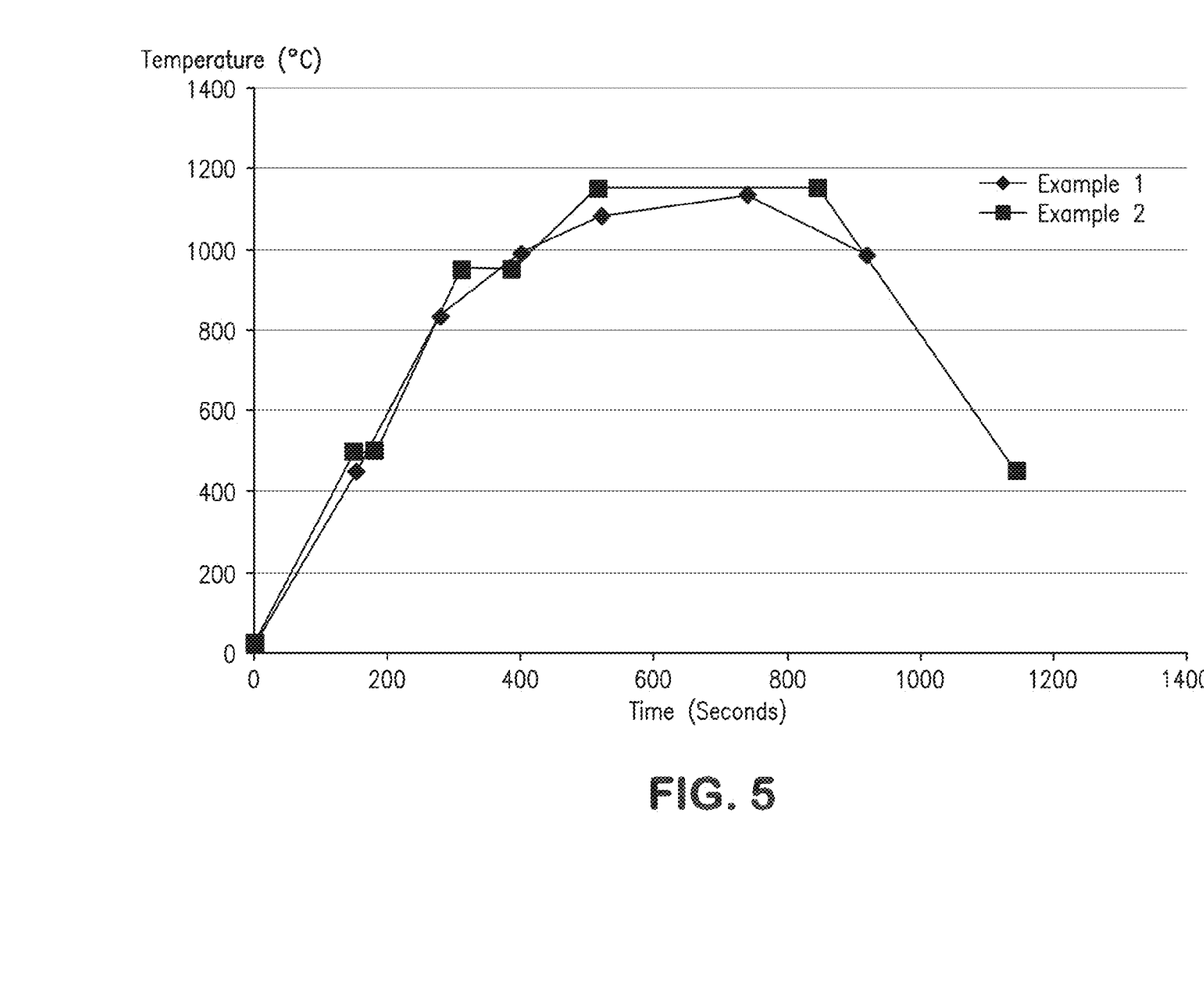
FIG. 5 is a graph depicting the time versus temperature profile suitable for use in the present method of making a glass-ceramic seal.

Example 2 was performed to show the effectiveness of higher temperature ramp rates during both heating sequences and cooling sequences and with temperature soaking between steps. The temperature cycling profiles of Example 2 are shown in FIG. 5. As seen therein, the initial heating of the assembly using an induction heating furnace at a temperature ramp rate of about 200° C./min from 25° C. to 500° C. followed by a short temperature soak of 30 seconds and resuming the initial heating at about 200° C./min temperature ramp rate to about 950° C. followed by a second temperature soak lasting about 75 seconds. This was followed further heating of the assembly at a ramp rate of about 100° C./min to a temperature of 1150° C. followed by another temperature soak lasting about 330 seconds. Finally, the assembly was cooled from 1150° C. to 450° C. at a cooling rate of 140° C./min to nucleate and re-crystallize the glass-ceramic seal. The resulting seal was porous and had physical characteristics similar to those shown in FIGS. 4A and 4B. The entire cycle time lasted about 19 minutes.

Example 3

Figure 6:
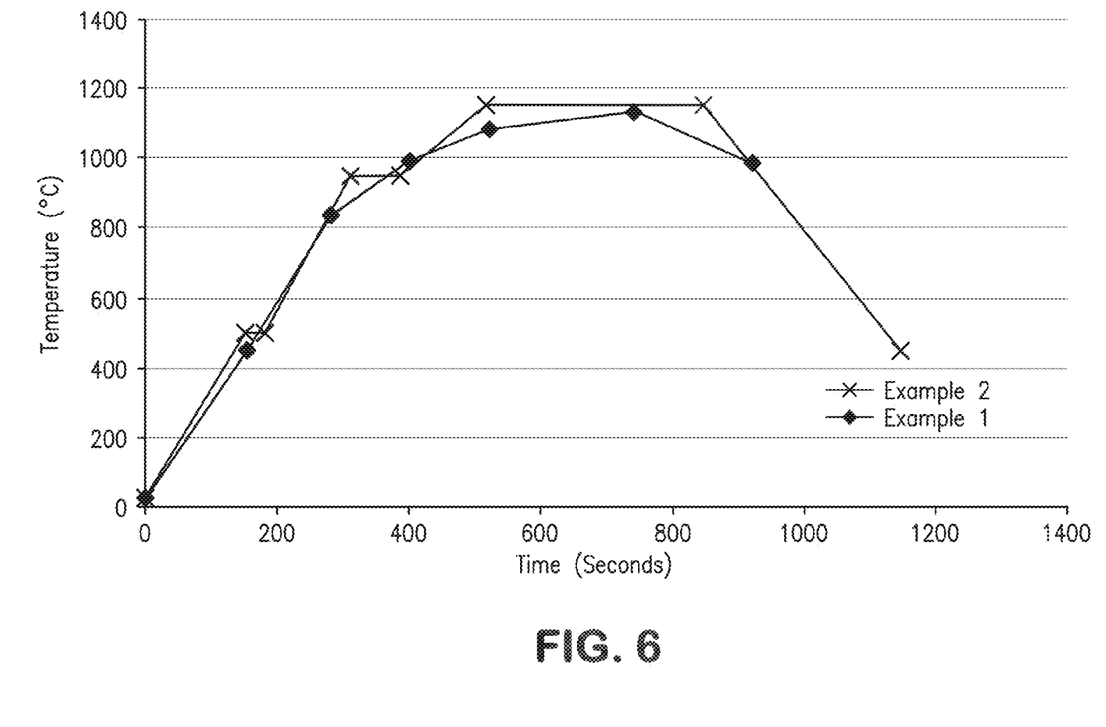
FIG. 6 is another graph depicting an alternate time versus temperature profile suitable for use in the present method of making a glass-ceramic seal.

Example 3 was also performed to show the effectiveness of higher temperature ramp rates during both heating sequences and cooling sequences but with different temperature soaking durations between steps. The temperature cycling profiles of Example 3 are shown in FIG. 6. As seen therein, the initial heating of the assembly using an induction heating furnace at a temperature ramp rate of about 200° C./min from 25° C. to 500° C. followed by a short temperature soak of 30 seconds and resuming the initial heating at about 200° C./min temperature ramp rate to about 950° C. followed by a second temperature soak lasting about 120 seconds. This was followed further heating of the assembly at a ramp rate of about 100° C./min to a temperature of 1150° C. followed by another temperature soak lasting only about 220 seconds. Finally, the assembly was cooled from 1150° C. to 450° C. at a cooling rate of 140° C./min to nucleate and re-crystallize the glass-ceramic seal. The resulting seal was porous and had physical characteristics similar to those shown in FIGS. 4A and 4B. The entire cycle time lasted about 18 minutes.

While the present invention has been characterized in various ways and described in relation to preferred embodiments, as will occur to those skilled in the art, numerous, additions, changes and modifications thereto can be made to the present method without departing from the spirit and scope of the present invention as set forth in the appended claims.

The invention claimed is:

1. A method of sealing a first ceramic part to a second ceramic part configured to receive the first ceramic part, the method comprising the steps of:
    placing a glass-ceramic bond agent comprising a glass-ceramic material and organic binder material in a volumetric ratio of from about 4:1 to about 1.5:1 on one or more adjoining surfaces of the first ceramic part and the second ceramic part, wherein said glass-ceramic bond agent comprises a blend of from about 2 mol % to about 15 mol % of $Al_2O_3$, from about 40 mol % to about 70 mol % $SiO_2$ and from about 20 mol % to 55 mol % BaO, SrO, CaO, MgO or combinations thereof;
    heating the first ceramic part, the second ceramic part and the bond agent to remove or dissolve the organic binder material;
    further heating the first ceramic part and the second ceramic part at a rate of greater than about 100° C. per minute to temperatures where the glass-ceramic material reacts with carbon from the organic binder material and the glass-ceramic material flows into or wets the interface between adjoining surfaces of the first ceramic part and the second ceramic part; and
    cooling the first ceramic part and the second ceramic part at a rate of greater than about 100° C. per minute to nucleate and re-crystallize the glass-ceramic material disposed between adjoining surfaces of the first ceramic part and the second ceramic part and form a hermetic or gas-tight seal between the first ceramic part and the second ceramic part, said seal able to withstand temperatures of >800° C. and pressures of >100 psi, wherein the steps of heating and cooling the first ceramic part and the second ceramic part further comprise using an induction heating element to effect the temperature changes.

2. The method of claim 1 wherein the organic binder material is a combination of phosphate ester, polyvinyl butyrai and butyl benzyl phthalate, and said glass-ceramic bond agent is a paste, slurry, film, ribbon, or tape disposed on one or more adjoining surfaces of the first ceramic part and the second ceramic part.

3. The method of claim 1 wherein the step of cooling the first ceramic part and the second ceramic part further comprises cooling the first ceramic part and the second ceramic part at a rate of between about 120° C. per minute to about 160° C. per minute to nucleate and re-crystallize the glass-ceramic material disposed between adjoining surfaces of the first ceramic part and the second ceramic solid part.

4. The method of claim 1 wherein the step of heating the first ceramic part and the second ceramic part to temperatures effective to flow and wet the glass-ceramic material further comprises heating the first ceramic part, the second ceramic part and the glass-ceramic material at a rate of between about 200° C. per minute to about 250° C. per minute.

5. The method of claim 1 further comprising the step of maintaining the temperature of the first ceramic part and the second ceramic part for a prescribed duration of between about 30 seconds to 360 seconds, the step of maintaining the temperature to be effected between or during the heating and cooling steps.

6. The method of claim 1, wherein the first ceramic part is a tubular oxygen transport membrane.

* * * * *